United States Patent Office 2,738,366
Patented Mar. 13, 1956

2,738,366

SEPARATION OF TYROSINE

Bruno Vassel, Deerfield, Ill., assignor to International Minerals & Chemical Corporation, a corporation of New York No Drawing. Application January 17, 1952,
Serial No. 267,000

11 Claims. (Cl. 260—519)

This invention relates to a process for the production of substantially pure tyrosine. More particularly, it relates to a process for the production of a pharmaceutical grade tyrosine from crude mixtures containing the same, principally in conjunction with other amino acids.

Tyrosine is a constituent of most protein hydrolysates. Tyrosine was first obtained by digesting casein with the enzyme trypsin. The hydrolysates of proteins contain a mixture of amino acids, all of which are relatively soluble in water, except tyrosine, cystine and the leucines. These compounds have physical properties which are very similar and are for this reason very difficult to separate. However, present demands for tyrosine of pharmaceutical grade have created the need for an economical and efficient process for its recovery and purification.

In present day processing of proteinaceous hydrolysates, such as acid hydrolysates of wheat and corn glutens for the production of monosodium glutamate, the humin which is formed during the hydrolysis step is separated, and then a crude tyrosine-leucine cake which contains minor amounts of cystine is separated from the hydrolysate. In the past, this by-product has been discarded. If tyrosine could be separated from the leucines and the cystine, and the impurities present in the precipitate of tyrosine separated, this cake would constitute an important and major source material for substantially pure pharmaceutical grade tyrosine.

It is an object of the instant invention to provide a process for the production of substantially pure tyrosine from amino acid-containing mixtures containing the same such as, for example, protein hydrolysates.

It is a further object of the instant invention to provide a process for the separation of substantially pure tyrosine from crude mixtures containing principally tyrosine, leucine and cystine.

It is a further object of the instant invention to provide a process for the substantially complete separation of cystine from tyrosine.

These and other objects of the instant invention will become more apparent upon a fuller understanding of the invention as herein set forth.

In general, the instant novel process comprises extracting cystine from tyrosine with an aqueous solution containing ammonium hydroxide. Although, individually, both cystine and tyrosine are soluble in solutions of sodium hydroxide and of ammonium hydroxide, it has been discovered that when cystine and tyrosine are both present in a mixture, cystine is preferentially dissolved by ammonium hydroxide and the remaining solid residue of tyrosine is substantially free of cystine.

In practicing one embodiment of the instant invention, a mixture containing a major amount of tyrosine and a minor amount of cystine is mixed with sufficient aqueous ammonium hydroxide to produce a pH of between about 10.70 and about 11.25 in the resulting mixture. The cystine is thus dissolved, and is then separated from the solid tyrosine by any convenient method such as by filtration or centrifugation.

In one embodiment a cake containing tyrosine, leucine and cystine is separated from an acid-hydrolyzed wheat gluten hydrolysate at a pH of between about 5.5 and about 6.5. This cake is mixed with sufficient aqueous hydrochloric acid solution to dissolve substantially all of the tyrosine, cystine and the leucines present in the mixture. The aqueous acid solution is added at a temperature between about 60° C. and about 100° C., preferably at between about 90° C. and about 95° C., and has a pH of between about 0.5 and about 2.0, preferably a pH between about 1.0 and about 1.5. The resulting hot solution containing tyrosine, leucine and cystine is decolorized, the solution filtered, and the colorless filtrate is adjusted to a pH of between about 2.0 and about 3.5, preferably to a pH between about 2.5 and about 3.0. The adjusted solution is allowed to cool for between about 4 and about 24 hours, preferably between about 8 and about 16 hours. The leucines are substantially completely soluble under those conditions while the tyrosine and cystine crystallize out. The tyrosine-cystine mixture which crystallizes is separated from the leucine solution by any convenient method, such as by filtration. This solid mixture generally contains between about 70.0% and about 98.0% of tyrosine, between about 15% and about 2% of cystine respectively and a small amount of colored pigment impurities.

In a specific embodiment of the instant invention this cystine-tyrosine mixture is then mixed with between about 4 and about 7 parts by weight of water, preferably with about 5 parts of water per part of tyrosine mixture. An ammonium hydroxide solution is added to the resulting aqueous solution in sufficient amount to adjust the pH of the resulting solution to between about 10.70 and about 11.25, preferably to a pH of about 10.8. Although a concentrated (28%) ammonium hydroxide solution is preferred, a more dilute ammonium hydroxide solution can be used, but correspondingly less water should be used to slurry the cystine-tyrosine mixture. As an example, 100 gms. of tyrosine-cystine mixture are preferably slurried with 500 mls. of water, and about 80 mls. of 28% ammonium hydroxide are added to obtain a pH of about 10.8. However, the same results are obtained if about 355 mls. of water are used to slurry 100 gms. of tyrosine-cystine mixture and 225 mls. of 10% ammonium hydroxide are used to adjust to a pH of about 10.8. Although the concentration of the tyrosine in the resulting ammonium hydroxide solution is not critical, there must be sufficient liquid in order that mixing be efficient. However, it is preferable not to employ too dilute solutions because the yield of tyrosine is decreased if very dilute solutions are employed. It is preferred that the volume of the ammonium hydroxide extraction mixture be about 580 mls. per 100 gms. of tyrosine mixture to be extracted. However, the solution may be more concentrated or more dilute than this, for example, the total volume of the ammonium hydroxide solution may be between about 500 mls. and about 600 mls. per 100 gms. of tyrosine mixture.

The adjusted mixture is agitated for at least about 45 minutes, preferably for about 1.5 hours to insure complete solution of the cystine. Solid tyrosine is separated from the cystine-containing solution by any convenient method such as by filtration. The resulting tyrosine is washed by suspending it in between about 150 mls. and about 350 mls., preferably in about 250 mls., of weakly ammoniacal solution prepared by diluting about 15 mls. of 28% ammonium hydroxide with water to about 1 liter. After between about 5 and about 10 minutes of stirring, the slurry is filtered. If water were used for this washing step instead of the ammonium solution, the drop in the pH of the mother liquors from about 10.8 to a pH of about 9.0 or below would cause precipitation of the cystine of the entrained mother liquors.

The tyrosine which is isolated may contain coloring matter, and if so is decolorized by any convenient method, for example, by dissolving and employing decolorizing carbon, to obtain substantially 100% pure tyrosine of white color. For example, the cystine-free tyrosine is decolorized by suspending the tyrosine in a saturated solution of tyrosine, such as a solution from a previous re-crystallization. The pH of the solution is adjusted with hydrochloric acid to between about 1.3 and about 1.5. The adjusted mixture is then heated to a temperature between about 65° C. and about 100° C., preferably to between about 80° C. and about 85° C., and decolorizing carbon is added to the hot mixture. The mixture is allowed to stand for a few minutes to allow decolorization to occur, and the carbon is separated from the hot solution by any convenient method such as by filtration. The resulting solution is allowed to cool, and pure white tyrosine precipitated from the cooled liquor. The recovery of tyrosine averages better than about 98% when a saturated tyrosine solution is used for the re-crystallization.

In order to more fully illustrate the nature of the instant novel process, but with no intention of being limited thereto, the following example is given:

*Example*

About 500 gms. of a powdered crude mixture containing about 85% of tyrosine and about 15% cystine was suspended in about 2500 cc. of water. About 400 cc. of an aqueous solution containing about 28% ammonium hydroxide was added to the aqueous tyrosine mixture with stirring. The resulting mixture was stirred for about one and one-half hours, and the tyrosine was separated from the cystine-containing solution by filtration. The tyrosine pricipitate was mixed with about 1250 cc. of water containing about 15 cc. of 28% ammonium hydroxide per 1000 cc. of solution. Tyrosine was separated from the resulting mixture by filtration and was washed with water. The tyrosine contained no cystine. The recovery of tyrosine was about 89.6% based on the tyrosine content of the tyrosine-cystine mixture.

About 115 gms. of the cystine-free tyrosine was suspended at room temperature in about 32 liters of water saturated with respect to tyrosine. Hydrochloric acid was was added to the suspension to adjust the pH to between about 1.3 and about 1.5, and the adjusted suspension was heated to a temperature of between about 80° C. and about 85° C. with agitation. About 5.75 grams of decolorizing carbon was added to the heated mixture which was then agitated for an additional 10 minutes. The resulting hot mixture was filtered. The clear filtrate was allowed to cool, and pure white tyrosine crystallized from the solution and recovered in the amount of about 104 gms.

Having thus fully described and illustrated the character of the invention, what is desired to be secured and claimed by Letters Patent is:

1. A process for the purification of tyrosine which comprises mixing crude cystine-containing tyrosine with sufficient ammonium hydroxide solution to produce a pH of between about 10.70 and about 11.25 in the resulting mixture, and separating solid tyrosine from the resulting cystine-containing solution.

2. A process for the purification of tyrosine which comprises mixing a crude mixture of tyrosine which contains cystine with a solution containing sufficient ammonium hydroxide to produce a pH of between about 10.70 and about 11.25 in the resulting mixture, agitating the resulting mixture for a sufficient length of time to substantially completely dissolve all of the cystine, and separating solid tyrosine from the resulting cystine-containing solution.

3. A process for the purification of tyrosine which comprises mixing about 1 part of a crude tyrosine mixture which contains cystine with between about 4 and about 7 parts of water, adding sufficient ammonium hydroxide solution to the aqueous tyrosine mixture to produce a pH of between about 10.70 and about 11.25 in the resulting mixture, agitating the resulting mixture for at least about 45 minutes, and separating solid tyrosine from the resulting cystine-containing solution.

4. A process for the purification of tyrosine which comprises mixing about 1 part of a crude tyrosine mixture with between about 4 and about 7 parts of water, adding sufficient ammonium hydroxide solution to the aqueous tyrosine mixture to produce a pH of between about 10.70 and about 11.25 in the resulting mixture, agitating the resulting mixture for at least about 45 minutes at a temperature of between about 65° C. and about 100° C., and separating solid tyrosine from the resulting cystine-containing solution.

5. A process for the purification of tyrosine which comprises adding between about 4 and about 7 parts of water to about 1 part of the crude tyrosine mixture containing between about 70% and about 98% tyrosine and between about 15% and about 2% cystine respectively, adding sufficient ammonium hydroxide to produce a pH of between about 10.70 and about 11.25 in the resulting mixture, agitating the adjusted mixture for at least about 45 minutes, separating solid tyrosine from the resulting cystine-containing solution, and washing the tyrosine precipitate with a dilute aqueous ammonium hydroxide solution.

6. A process for the purification of tyrosine which comprises mixing a crude mixture of tyrosine which contains cystine with between about 500 mls. and about 600 mls. per 100 gms. of tyrosine mixture of a solution containing sufficient ammonium hydroxide to produce a pH of between about 10.70 and about 11.25 in the resulting mixture, dissolving cystine and separating solid tyrosine from the resulting cystine-containing solution.

7. A process for the purification of tyrosine which comprises mixing a crude mixture of tyrosine which contains cystine with about 580 mls. per 100 gms. of tyrosine mixture of a solution containing sufficient ammonium hydroxide to produce a pH of between about 10.70 and about 11.25 in the resulting mixture, dissolving cystine and separating solid tyrosine from the resulting cystine-containing solution.

8. A process for the purification of tyrosine which comprises adding between about 4 and about 7 parts of water to about 1 part of the crude tyrosine mixture containing between about 70% and about 98% tyrosine and between about 15% and about 2% cystine respectively, adding sufficient ammonium hydroxide solution to produce a pH of between about 10.70 and about 11.25 in the resulting mixture, dissolving the cystine, separating solid tyrosine from the resulting cystine-containing solution, washing the tyrosine precipitate with an aqueous ammonium hydroxide solution, suspending the cystine-free tyrosine in an aqueous solution saturated with respect to tyrosine, adding sufficient hydrochloric acid to the cystine-free tyrosine suspension to produce a pH of between about 1.3 and about 1.5 in the resulting mixture, heating the adjusted mixture to a temperature between about 80° C. and about 85° C., adding decolorizing carbon to the hot mixture, separating the carbon from the hot mixture upon completion of the decolorization, cooling the tyrosine-containing solution, crystallizing and recovering tyrosine therefrom.

9. In a process of hydrolyzing protein, separating humin from the hydrolysate, and separating from the humin-free hydrolysate at a pH of between about 5.5 and about 6.5 a tyrosine-cystine-leucine cake, the improvements comprising mixing at a temperature between about 60° C. and about 100° C. the tyrosine-cystine-leucine mixture with a sufficient aqueous hydrochloric acid solution to obtain a pH of between about 0.5 and about 2.0, separating solid material from the resulting aminoacid containing solution, adjusting the pH of the resulting solution to between about 2.0 and about 3.5, separating the tyrosine-cystine mixture which precipitates from the solution, adding between about 5 and about 7 parts of water per part of tyrosine mixture separated, adding concentrated ammonium hydroxide solution to the aqueous tyrosine-containing solution in sufficient amount to produce a pH of between about 10.70 and about 11.25 in the resulting mixture, and separating solid tyrosine from the resulting cystine-containing solution.

10. In a process of hydrolyzing protein, separating humin from the hydrolysate, and separating from the humin-free hydrolysate a tyrosine-cystine-leucine cake at a pH of between about 5.5 and about 6.5, the improvements comprising mixing at a temperature between about 60° C. and about 100° C. the tyrosine-cystine-leucine mixture with sufficient aqueous hydrochloric acid solution to obtain a pH between about 1.0 and about 1.5, decolorizing the resulting amino acid solution, adjusting the pH of said solution to between about 2.5 and about 3.0, separating the tyrosine-cystine mixture which precipitates from the solution, adding between about 4 parts and about 7 parts of water per part of tyrosine mixture separated, adding concentrated ammonium hydroxide solution to the aqueous tyrosine-containing solution in sufficient amount to produce a pH of between about 10.70 and about 11.25 in the resulting mixture, agitating the resulting mixture for at least about 45 minutes, separating solid tyrosine from the resulting cystine-containing solution, and washing the tyrosine with a dilute ammonium hydroxide solution.

11. In a process of hydrolyzing protein, separating humin from the hydrolysate, and separating a tyrosine-cystine-leucine cake from the humin-free hydrolysate at a pH of between about 5.5 and about 6.5, the improvements comprising mixing at a temperature between about 60° C. and about 100° C. the tyrosine-cystine-leucine mixture with sufficient aqueous hydrochloric acid solution to obtain a pH of between about 1.0 and about 1.5, separating solid material from the resulting amino-acid containing solution, adjusting the pH of said solution to between about 3.0 and about 2.5, separating a tyrosine-cystine mixture which precipitates from the solution, adding between about 5 and about 7 parts of water per part of tyrosine mixture separated, adding concentrated ammonium hydroxide solution to the aqueous tyrosine-containing solution in sufficient amount to produce a pH of between about 10.70 and about 11.25 in the resulting mixture, agitating the resulting mixture for at least about one hour, separating solid tyrosine from the resulting cystine-containing solution, suspending the cystine-free tyrosine in an aqueous solution saturated with respect to tyrosine, adding sufficient hydrochloric acid to the cystine-free tyrosine suspension to produce a pH of between about 1.3 and about 1.5 in the resulting mixture, heating the adjusted mixture to a temperature between about 80° C. and about 85° C., adding decolorizing carbon to the hot mixture, separating the carbon from the hot solution upon completion of the decolorization, cooling the tyrosine-containing solution, and crystallizing tyrosine therefrom.

References Cited in the file of this patent

UNITED STATES PATENTS

| | | |
|---|---|---|
| 2,009,868 | Barnett | July 30, 1935 |
| 2,178,210 | Mark | Oct. 31, 1939 |
| 2,376,186 | Rapkine | May 15, 1945 |
| 2,471,053 | Almquist et al. | May 24, 1949 |
| 2,650,242 | Cardinal | Aug. 25, 1953 |

FOREIGN PATENTS

| | | |
|---|---|---|
| 856,379 | France | Mar. 18, 1940 |

OTHER REFERENCES

Plimmer: Biochem. J., vol. 7, pages 311–17 (1914).
Plimmer: Chem. Abstracts, vol. 8, p. 1798 (1914).
Susuki: Chem. Abstracts, vol. 11, p. 2391 (1917).
Hitchcock: Chem. Abstracts, vol. 18, p. 3607 (1924).
Sano: Chem. Abstracts, vol. 20, p. 1820 (1926).
Greenbaum: Chem. Abst., vol. 29, p. 6262 (1935).
Heilbron: "Dict. of Org. Comp'ds" (Oxford), vol. I, p. 610 (1943).
Anson et al.: "Advances in Protein Chem." vol. III, p. 333 (1947).
Block et al.: "Amino Acid Composition of Proteins and Foods," p. 85 (1947).
Zachary et al.: J. Biol. Chem., vol. 177, pps. 715–716 (1949).